(12) United States Patent
Reinhardt et al.

(10) Patent No.: US 7,669,909 B2
(45) Date of Patent: Mar. 2, 2010

(54) SEATING POSITION INDICATOR

(75) Inventors: Helene Reinhardt, V. Frölunda (SE);
Elna Holmberg, Västra Frölunda (SE)

(73) Assignee: Ford Global Technologies, LLC,
Dearborn, MI (US)

( * ) Notice: Subject to any disclaimer, the term of this patent is extended or adjusted under 35 U.S.C. 154(b) by 863 days.

(21) Appl. No.: 11/203,533

(22) Filed: Aug. 12, 2005

(65) Prior Publication Data
US 2007/0035150 A1 Feb. 15, 2007

(51) Int. Cl.
*B60N 2/00* (2006.01)
(52) U.S. Cl. ..................... 296/65.01; 359/630
(58) Field of Classification Search ............ 359/15, 359/630; 701/49; 296/64, 65.01
See application file for complete search history.

(56) References Cited

U.S. PATENT DOCUMENTS

| | | | |
|---|---|---|---|
| 4,797,824 A | 1/1989 | Sugiyama et al. | |
| 5,684,701 A * | 11/1997 | Breed | 701/45 |
| 6,384,980 B1 * | 5/2002 | McKinley | 359/619 |
| 6,542,646 B1 * | 4/2003 | Bar-Yona | 382/284 |
| 6,614,344 B1 * | 9/2003 | Frasher et al. | 340/425.5 |
| 2004/0151491 A1 * | 8/2004 | Coleman et al. | 396/376 |
| 2004/0263968 A1 * | 12/2004 | Kobayashi et al. | 359/462 |

OTHER PUBLICATIONS

Lenticular printing-Wikipedia, the free encyclopedia. Http://en.wikipedia.org/wiki/Lenticular_printing.*

* cited by examiner

*Primary Examiner*—Glenn Dayoan
*Assistant Examiner*—Melissa A Black
(74) *Attorney, Agent, or Firm*—Gregory Brown; Brooks Kushman P.C.

(57) ABSTRACT

An arrangement (10) for assisting a passenger (22) to obtain a correct seating position in a seat (21) of a vehicle is provided. The vehicle comprising at least the seat (21) and an area (20) which may be seen by the passenger (22) when seated in the seat (21). The arrangement (10) comprising a position indicator (11) arranged to be provided on the area (20). The position indicator (11) displaying at least a first image (13) when seen in at least a first corresponding optic angle interval ($\alpha$), and a second image (14) when seen in at least a second corresponding optic angle interval ($\beta$).

20 Claims, 2 Drawing Sheets

SEATING POSITION INDICATOR

The present invention relates to an arrangement for assisting a passenger to obtain a correct seating position in a seat of a vehicle. The present invention also relates to a vehicle provided with such an arrangement.

BACKGROUND

In the present day situation it is well known that the ergonomics of the passengers, and particularly the ergonomics of the driver in vehicles, have an impact on the number of traffic incidents and accidents. For example, the risk of traffic incidents and accidents increases when the sight and visibility of the surrounding traffic by the driver is unsatisfactory.

In many cases an unsatisfactory sight and visibility depend on the seating position of the driver in the vehicle. Then the seating position of the driver may be too high or too low in the vertical direction due to a too high or too low position of the seat. Obviously, the seating position of the driver may also depend on the inclination of the driver's seat.

In a greater perspective an unsatisfactory sight and visibility depend on the described seating position and the actual seat position as well as the position of the steering wheel and the pedals. However, the position of the steering wheel and the pedals is not discussed hereinafter.

The seat position itself is generally manually or electrically adjusted by the driver and the other passengers in a vehicle. Today, automatic seat position adjustments are known as well. One type of automatic seat position adjustment is preadjustment for a particular person, e.g. a particular seat position is connected to a particular ignition key. This implies that the seat can take a particular position with respect to the inclination and the vertical and horizontal position of the seat.

However, a confirmation or a "warning" of an unsatisfactory seating position of the driver is neither provided nor communicated to the driver.

SUMMARY OF THE INVENTION

An arrangement for assisting a passenger to obtain a correct seating position in a seat of a vehicle is provided. Particularly, the arrangement may ensure and confirm a good ergonomic seating position of the passenger, particularly with regard to the sight and visibility of the surrounding traffic by the passenger. In this way the passive safety is increased, and the risk for incidents and accidents is decreased.

The arrangement provides a technical design, which may be inexpensive to manufacture and use.

The arrangement includes a technical design which is easily provided in every vehicle on the market, i.e. existing vehicles and newly manufactured vehicles. Obviously, this is also valid for vehicles on sale, exhibitions and vehicle shows, etc.

The arrangement can assist a passenger to obtain a correct seating position in a seat of a vehicle and can be provided within a vehicle. The vehicle includes the seat and an area which may be seen by said passenger when seated in said seat, and the arrangement comprising a position indicator being arranged to be provided on said area, and the position indicator displaying at least a first image when seen in at least a first corresponding optic angle interval, and a second image when seen in at least a second corresponding optic angle interval.

In this context, the optic angle is defined as the viewing angle from the eyes of the passenger towards the image(s) with relation to the normal against the plane of the position indicator displaying the image(s). The position indicator displaying the images is fixedly arranged onto an area inside a vehicle. The passenger views or monitors the position indicator in different viewing angles with relation to the normal against plane of the position indicator when seated in different seating positions, particularly in the vertical direction. "An optic angle interval" relates to an interval of such angles.

The at least first and second images indicate the position of the eyes of the passenger when seated in at least two different seating positions. The passenger may see the different images, which indicate different seating positions on the position indicator on the area that may be seen by the passenger (hereinafter referred to as "the area") in the vehicle when viewing the position indicator in different optic angles. Obviously, the passenger views the area in different optic angles when seated in different seating positions since the eyes of the passenger then is located in different positions, particularly with regard to the vertical position thereof.

In one embodiment of the invention, the position indicator comprises a lenticular 3D (three dimensional) object. A side or surface of the position indicator is substantially flat. The side or surface is preferably provided with the lenticular 3D object. The position indicator is preferably constituted of a card which is manufactured of a plastic material. Thus, the plastic card is preferably provided with a lenticular 3D object displaying at least the described first image when seen in the corresponding first optic angle interval, and the second image when seen in the corresponding second optic angle interval.

In the present day situation, so-called lenticular printing processes are well-known as well. Generally, the lenticular printing processes are printing processes allowing pictures having depth (three dimensional, i.e. 3D), motion, video, film or a combination of these to be printed and thereby displayed on a flat sheet or piece of a plastic material. In practice, lenticular 3D cards are well-known in the advertising business, for instance for advertising articles or the like.

The image effects of the lenticular 3D cards are created by using "lenticules" provided into the plastic piece which operate as a decoder for the image which is printed behind the lenticules (hence the name "lenticular" printing). In greater detail, the lenticular material is created by means of lenses or tiny ridges. The described ridges generally have a "sawtoothed" characteristic in profile. The ridges substantially protrude in the direction of the normal of the lenticular 3D card.

In greater detail, the raw images are processed through a computer algorithm which matches the lens surface of the lenticular material and then enables the images to be shown to a viewer.

The sizes and the amounts of the described ridges decide the size of the shown image, or the distance at which the images is intended to be seen, i.e. the so-called "viewing distances". Generally, a fine gauge lenticular (tiny ridges) tends to be used for applications having close viewing distances, and heavy gauge lenticular (great ridges) tends to be used for applications having large viewing distances.

The lenticular 3D printing technology is well-known in the prior art and is therefore not described any further hereinafter.

In another embodiment, the plastic card comprises a lenticular 3D image showing the first image which then indicates a correct seating position of the passenger in an ergonomic aspect, and the second image which indicates an incorrect seating position of the passenger in an ergonomic aspect. Advantageously, the second optic angle interval is then constituted of the remaining optic angle intervals.

In this context, a "correct" seating position of the passenger in an ergonomic aspect relates to the position of the eyes of the passenger for providing him or her good sight and visibility of the surrounding traffic and pedestrians for avoiding traffic incidents and accidents. Accordingly, an "incorrect" seating position relates to the position of the eyes of the passenger providing him or her poor visibility of the surrounding traffic and pedestrians. An indication of an incorrect seating position of the passenger could indicate a higher risk for a traffic incident or accident.

If the seating position of the passenger is not satisfactory in an ergonomic aspect, i.e. if the passenger is not provided with a good sight and visibility of the surrounding traffic in the seating position, it is appropriate that the passenger adjusts the seating position. Thus, the arrangement operates as a type of visibility confirm ability concept.

If the seating position is satisfactory in an ergonomic aspect, i.e. if the passenger is provided with a good sight and visibility of the surrounding traffic in the seated position, the passenger obtains a type of confirmation thereof.

In another embodiment, the lenticular 3D object displays at least two already described images indicating incorrect seating positions in an ergonomic aspect, whereof the described second image indicates a too high vertical seating position of the passenger when seen in a corresponding second optic angle interval, and a third image indicates a too low vertical seating position of the passenger when seen in a third corresponding optic angle interval. In this embodiment, the first image still indicates a correct seating position in an ergonomic aspect.

If the passenger is located in a too high vertical seating position, the second image appears and then indicates that the passenger should adjust his or hers seating position in a substantially downward direction. This is achieved by displacing the seat in a substantially downward direction, or alternatively to adjust the seat in another inclination with relation to the plane of the floor of the vehicle compartment so that the passenger is displaced in a substantially downward direction. Accordingly, if the passenger is located in a too low vertical seating position the third image appears and indicates that the passenger should adjust his or hers seating position in a substantially upward direction. This is achieved by displacing the seat in a substantially upward direction or alternatively to adjust the seat in another inclination with relation to the plane of the floor of the vehicle compartment so that the passenger is displaced in a substantially upward direction.

If the passenger is located in a correct seating position in an ergonomic aspect, an image does not appear. The image and the plastic card may be transparent and run together with the area such as the cloth and color of the area. Obviously, another type of image which indicates a correct seating position could also appear.

The area that may be seen by the passenger may be a part of a pillar, which may be seen by the passenger when seated in the seating position. It can be any area substantially in front of the passenger and in a suitable vertical level so the area may be seen by the passenger when seated in the intended seat of the vehicle. Preferably, the pillar is constituted of an A, B or C pillar of the vehicle.

The pillar, and consequently the plane of the position indicator, is generally angled against the ground (or alternatively angled to the normal against the ground). Moreover, the pillar itself is generally provided with a curvature. Since the passenger views the positions indicator in the described optic angle or the viewing angle, the described ridges, lenticules or saw-tooth characteristic of the lenticular 3D-card are preferably provided so that they are directed and thereby points against the eyes of the passenger. In greater detail, the described protruding lenticules of the lenticular 3D-card are preferably provided fixedly protruding in the same angle against the normal to the lenticular 3D card or the plane of the lenticular 3D-card as an intended correct viewing angle of a great number of people.

Advantageously, the pillar is constituted of the A pillar since the passenger is preferably the driver of the vehicle. However, any passenger of the vehicle can have benefit of the arrangement for ergonomic reasons.

In another embodiment, the position indicator is provided on the area by means of a fastening means. For instance, the fastening means is constituted of an adhesive so that the position indicator may be pushed or be impressed onto the surface of the area that may be seen by the passenger, e.g. the A-pillar. However, the fastening means can also be constituted of a snapping means onto which the position indicator may be snapped. The pillar can also be provided with a holder means into which the position indicator can be put or inserted.

The position indicator may be arranged on the area that comprises an electrical means for displaying the at least first and second images when seen in different optic angles. For example, the position indicator can then be provided with monochromatic light. Advantageously, in other aspects the same characteristics as described above can then be provided by means of the inventive arrangement.

Preferably, a correct seating position of the passenger in an ergonomic aspect relates to the position of the eyes of the passenger for providing the passenger a good sight and visibility of the surrounding traffic. Moreover, the position of the eyes of the passenger in relation to the position of the position indicator is adjustable for persons having different height and body constitution.

BRIEF DESCRIPTION OF THE DRAWINGS

The invention will be described in the following by way of example only and with reference to the embodiments illustrated in the drawings, in which.

DETAILED DESCRIPTION OF PREFERRED EMBODIMENTS

Figure 2:
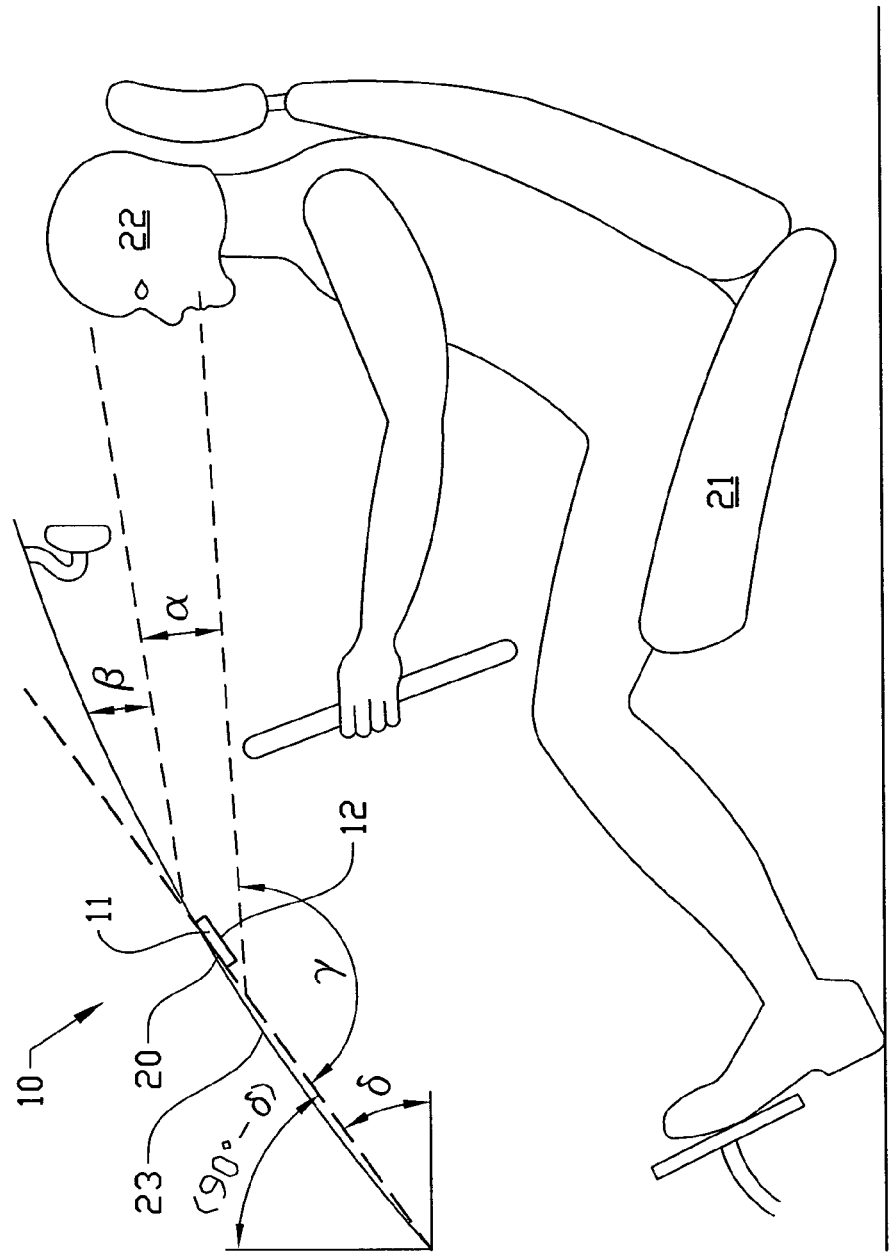
FIG. 2 shows a principal sketch of the inventive arrangement provided in a vehicle.

In the drawings, reference numeral 10 generally denotes an arrangement for assisting a passenger 22 to obtain a correct seating position in a seat 21 of a vehicle, see FIG. 2. Hereinafter, the passenger 22 is preferably constituted of the driver of the vehicle.

In a preferred embodiment of the invention, the arrangement 10 comprises a position indicator. The position indicator is constituted of a plastic card 11 which in turn comprises a substantially flat side 12 which is provided with a lenticular 3D (three dimensional) object, see FIGS. 1a-1c.

The lenticular 3D object comprises lenticules which are provided into the plastic card. The lenticules are a type of lenses which serve as a decoder for the image(s) which is arranged behind the lenticules (not shown in the figures). This technology is well-known in prior art and is therefore not further described hereinafter.

The lenticular 3D object may display different lenticular 3D images when seen in different optic angle intervals. As can be seen in the figures, in the preferred embodiment the lenticular 3D object shows a first 13, a second 14 and a third image 15 when viewed in corresponding different optic angle intervals, see FIGS. 1a-1c.

In this context, the optic angle is defined as the viewing angle from the eyes of the passenger 22 towards the image(s) with relation to the normal against the plane of the position indicator 11 displaying the image(s). The position indicator 11 displaying the images is fixedly arranged onto an area 20 in a vehicle. The passenger 22 views or monitors the position indicator 11 in different viewing angles with relation to the normal against plane of the position indicator 11 when seated in different seating positions, particularly in the vertical direction.

"An optic angle interval" relates to intervals of such viewing angles, e.g. 0°-10°, 10°-20°, 20°-30°, etc. For instance, in FIG. 2 the passenger 22 has the capacity to view the image from a correct seating position shown in FIG. 1a in the viewing angle interval $\alpha(=(90°-\beta) -(90°-(\beta+\alpha)))$.

The described plastic card 11 can be tilted or inclined around e.g. a horizontal axis running through the center of the card 11 so that the side 12 is angled in relation to the angle of incidence of a passenger 22 standing still and viewing the card 11. In this way, it is possible for the passenger 22 to see the first 13, the second 14 and the third image 15 of the plastic card 11 in three corresponding optic angle intervals when tilting the card 11.

In operation, the plastic card 11 is fixedly provided onto an area 20 that may be shown to the passenger 22 when seated in a seat 21 in a vehicle see FIG. 2. Preferably, the area 20 is constituted of an A pillar 23 since the passenger 22 is preferably the driver of the vehicle. However, any passenger 22 of the vehicle can benefit from the arrangement 10 in form of the plastic card 11 provided with the lenticular 3D object and arranged onto the area 20 that may be shown to the passenger 22 when seated in a seat 21 in a vehicle.

The pillar 23, and consequently the plane of the position indicator, is angled δ against the ground or alternatively angled (90°-δ) to the normal against the ground), as illustrated in FIG. 2. The pillar 23 is generally provided with a curvature. Since the passenger 22 can view the positions indicator 11 in the described intended correct optic angle interval α, the described ridges, lenticules or saw-tooth characteristic of the lenticular 3D-card are preferably fixedly provided so that they are directed against the eyes of the passenger 22.

Furthermore, the position of the actual area 20 can be tested so it fits approximately 95% of the population. The other 5% has to be provided with an individual position of the area 20 for the position indicator 11. Preferably, such a position of the area 20 can be provided by the vehicle manufacturer, the vehicle sales man, or an ergonomically skilled person.

The plastic card 11 is provided onto the area 20 by a fastening means 16. In a preferred embodiment, the fastening means 16 is constituted of an adhesive so the plastic card 11 can be pushed onto the area 20. However, the fastening means 16 can also be constituted of a snapping means, onto which the plastic card 11 can be snapped, or even a holder means into which the plastic card 11 can be inserted or placed.

When the plastic card 11 is provided onto the area 20, the card 11 obtains a fixed position until the passenger 22 or another person removes the card 11 or changes the position of the card 11.

As can be seen in FIG. 2, the total possible interval of angles of incidence of a passenger 22 viewing the card 11 provided on the area 20 in the vehicle can be divided in three different optic angle intervals, as illustrated in FIG. 2.

The first optic angle interval a corresponds to the visibility of the passenger. The first optic angle interval a may correspond to an angle interval of 20°, for instance an angle interval from 30° to 50° from the plane of the plastic card 11 in FIG. 2.

The second optic angle interval β corresponds to a too high vertical position of the eyes of the passenger 22 or a too high seating position of the passenger 22. The second optic angle interval β may correspond to an angle interval of 30°, for instance an angle interval from 0° to 30° from the plane of the plastic card 11 in FIG. 2.

The third optic angle interval Y corresponds to a too low vertical seating position of the eyes of the passenger 22 or a too low seating position of the passenger 22. The third optic angle interval Y may correspond to an angle interval of 130°, for instance an angle interval from 50° to 180° from the plane of the plastic card 11 in FIG. 2.

These estimated optic angle intervals obviously differ for people having different height and body constitution of their torso, etc. Therefore the position of the plastic card 11 and thereby the location of the area 20 can be dimensioned so that it is valid for 95% or the population with some exceptions, for example men of a large height and women of a short height.

Figure 1A:
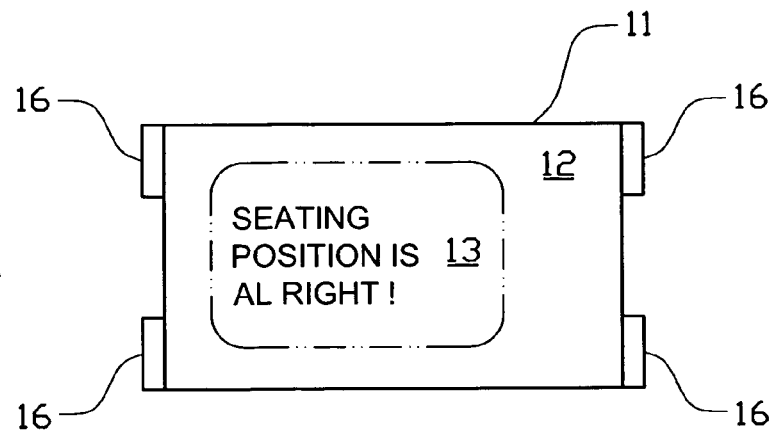
FIG. 1a-1c shows principal sketches of the position indicator of the inventive arrangement.

FIG. 1a shows an example of a first image 13 of the lenticular 3D object of the plastic card 11 when seen in the first optic angle interval α. The first image 13 indicates a correct seating position of the passenger 22 in an ergonomic aspect. In this seating position, the passenger 22 has a good sight and visibility of the surrounding traffic and pedestrians. Therefore the risk for traffic incidents and accidents when the passenger 22 is located in this seating position is relatively normal.

Figure 1B:
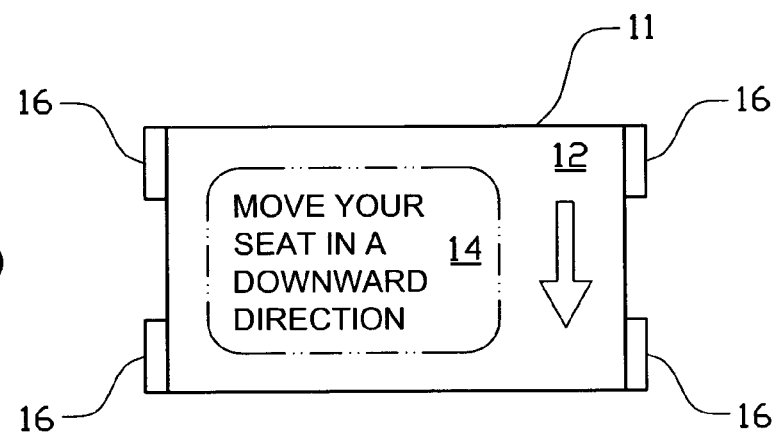

FIG. 1b shows an example of a second image 14 of the lenticular 3D object of the plastic card 11 when seen in the second optic angle interval β. This second image 14 indicates a too high seating position of the passenger 22.

Figure 1C:
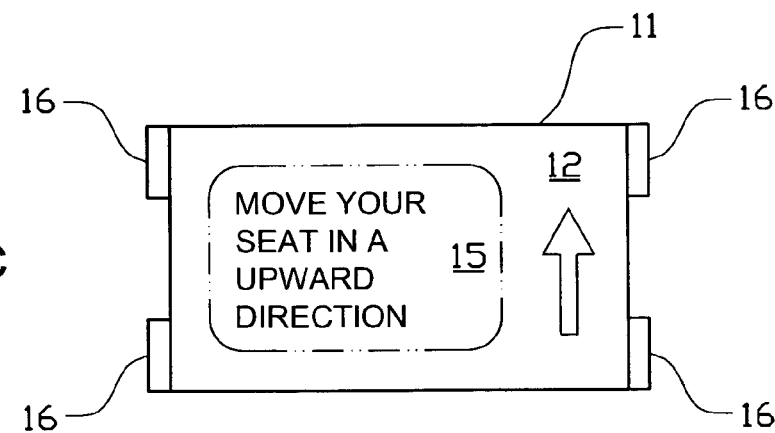

FIG. 1c shows an example of a third image 15 of the lenticular 3D object of the plastic card 11 when seen in the third optic angle interval γ. This third image 15 indicates a too low seating position of the passenger 22.

In the two last seating positions, the passenger 22 has a poor sight and visibility of the surrounding traffic and pedestrians as well. Therefore, the risk for traffic incidents and accidents are most probably higher than normal when the passenger 22 is located in a too low and a too high seating position.

The actual wording of the messages of the images of the lenticular 3D objects, the font, the color, the size of the total lenticular 3D object and thereby the image(s), etc. can differ considerably. These characteristics can be tested out by ergonomically skilled people.

The inventive arrangement 10 operates according to the following. A passenger 22 such as the driver is seated in the driver's seat 21 of a vehicle. Preferably before driving, but also during or after driving, the driver accidentally glances, and sometimes even monitors the position indicator such as the plastic card 11 provided onto the area 20 in form of the A-pillar 23.

If the driver has obtained an unsatisfactory and incorrect seating position such as a too high seating position, the second image 14 of the lenticular 3D object indicates that, see FIG. 1b. Then the driver may adjust his or hers seating position once or several times by adjusting the substantially vertical position or the inclination of the seat 21 in a substantially downward direction.

If the driver has obtained an unsatisfactory seating position such as a too low seating position, the third image 15 indicates that, see FIG. 1b. In the same way the driver can adjust his or hers seating position once or several times by adjusting the substantially vertical position or inclination of the seat 21 in a substantially upward direction.

If the seating position is satisfactory and correct in an ergonomic aspect, i.e. if the passenger 22 is provided with a good sight and visibility of the surrounding traffic in the seated position, the passenger 22 obtains a type of confirmation thereof, see FIG. 1a. Preferably, the plastic card 11 is arranged to be transparent if the seating position is satisfactory in an ergonomic aspect.

In one embodiment, the position of the passenger 22 can be controlled in one direction such as the substantially vertical direction. However, as can be seen in FIG. 2 when the seating position in the horizontal direction (the longitudinal direction of the vehicle) is chosen by the passenger, the arrangement 10 may assist the passenger to obtain a correct seating position once again, i.e. confirm a good ergonomic position of the seating position of the passenger in substantially the vertical direction. That is, the seating position in the longitudinal direction of the vehicle naturally affects the correct vertical seating position of the passenger 22 as well.

In this embodiment, the vertical seating position (z position in a conventional orthogonal system of coordinates) is mainly discussed. It may be assumed that the passenger him or her self picks a good position in the horizontal (the longitudinal direction of the vehicle, x position in an orthogonal system of coordinates) direction of the vehicle. Alternatively, the size of the message may be adjusted for the individual for assisting a passenger to obtain a correct seating position in the seat in the longitudinal direction of the vehicle.

Furthermore, the lateral seating position (y position in a conventional orthogonal system of coordinates) of the passenger seated in the seat in not discussed in this context. It is assumed that the position indicator 11 of the inventive arrangement can provide the passenger a good sight and visibility of the position indicator 11 in a sufficiently great optic angle interval in the lateral direction inside the vehicle compartment.

The invention has been described above and illustrated in the drawings by way of example only and the skilled person will recognize that various modifications may be made without departing from the scope of the invention as defined by the appended claims.

What is claimed is:

1. An indicator for a passenger in a vehicle, the indicator comprising:
   a composite image having at least a first image, a second image, and a third image;
   a lenticular lens optically aligned with the composite image, the lens being disposed in a plane, the lens having a plurality of lenticules protruding at an angle that is angularly offset from a line normal to the plane in which the lens is disposed, and the lens being configured to display the first image within a first optic angle interval ($\alpha$), the second image within a second optic angle interval ($\beta$), and the third image within a third optic angle interval ($\gamma$); and
   a mount configured to secure the lenticular lens to the composite image;
   wherein the first optic angle interval ($\alpha$) is between the second and third optic angle intervals ($\beta$ and $\gamma$) without overlapping the second and third optic angle intervals ($\beta$ and $\gamma$);
   wherein the first and second optic angle intervals ($\alpha$ and $\beta$) are angularly offset from the line normal to the plane based on an angle ($\delta$) that is between the plane in which the lens is disposed and ground; and
   wherein the passenger views the first image when viewing the composite image within the first optic angle interval ($\alpha$), the second image when viewing the composite image within the second optic angle interval ($\beta$), and the third image when viewing the composite image within the third optic angle interval ($\gamma$).

2. The indicator of claim 1 wherein the first optic angle interval ($\alpha$) is an angle interval of approximately 20 degrees, the second optic angle interval ($\beta$) is an angle interval of approximately 30 degrees, and the third optic angle interval ($\gamma$) is an angle interval of approximately 130 degrees.

3. The indicator of claim 1 wherein the lenticular lens prevents the passenger from viewing the second and third images when the passenger views the composite image within the first optic angle interval ($\alpha$), the first and third images when the passenger views the composite image within the second optic angle interval ($\beta$), and the first and second images when the passenger views the composite image within the third optic angle interval ($\gamma$).

4. The indicator of claim 1 wherein the first image indicates the passenger is positioned correctly in the vehicle, the second image indicates the passenger is positioned too high in the vehicle, and the third image indicates the passenger is positioned too low in the vehicle.

5. The indicator of claim 1 wherein the first image indicates the passenger is seated correctly in the vehicle, the second image indicates the passenger is seated too high in the vehicle, and the third image indicates the passenger is seated too low in the vehicle.

6. The indicator of claim 5 wherein the second image includes an instructional message instructing the passenger to move a seat of the vehicle in a downward direction, and the third image includes an instructional message instructing the passenger to move the seat of the vehicle in an upward direction.

7. The indicator of claim 5 wherein the first image is substantially transparent.

8. The indicator of claim 6 wherein the instructional message of the second image includes an arrow pointing in the downward direction to instruct the passenger to move the seat of the vehicle in the downward direction and the instructional message of the third image includes an arrow pointing in the upward direction to instruct the passenger to move the seat of the vehicle in the upward direction.

9. The indicator of claim 5 wherein the mount is configured to fasten to at least one of an A-pillar of the vehicle, a B-pillar of the vehicle, and a C-pillar of the vehicle.

10. The indicator of claim 9 wherein the lenticular lens is a plastic card configured to tilt and incline relative to the mount about a horizontal axis running the center of the plastic card.

11. An indicator for a passenger in a vehicle, the indicator comprising:
   a composite image having at least a first image indicating the passenger is seated correctly in the vehicle, a second image indicating the passenger is seated too high in the vehicle and having a written instructional message instructing the passenger to move a seat of the vehicle in a downward direction, and a third image indicating the passenger is seated too low in the vehicle and having a written instructional message instructing the passenger to move the seat of the vehicle in an upward direction;
   a lenticular lens optically aligned with the composite image, the lens being disposed in a plane, the lens having a plurality of lenticules protruding at an angle that is angularly offset from a line normal to the plane in which the lens is disposed, and the lens being configured to display the first image within a first optic angle interval (α), the second image within a second optic angle interval (β), and the third image within a third optic angle interval (γ); and a base for fixedly securing the lenticular lens to the composite image;

wherein the first optic angle interval (α) is between the second and third optic angle intervals (β and γ) without overlapping the second and third optic angle intervals (β and γ);

wherein the lenticular lens prevents the passenger from viewing the second and third images when the passenger views the composite image within the first optic angle interval (α), the first and third images when the passenger views the composite image within the second optic angle interval (β), and the first and second images when the passenger views the composite image within the third optic angle interval (γ);

wherein the first and second optic angle intervals (α and β) are angularly offset from the line normal to the plane based on an angle (δ) that is between the plane in which the lens is disposed and ground; and wherein the passenger views the first image when viewing the composite image within the first optic angle interval (α), the second image when viewing the composite image within the second optic angle interval (β), and the third image when viewing the composite image within the third optic angle interval (γ).

12. The indicator of claim 11 wherein the first optic angle interval (α) is an angle interval of approximately 20 degrees, the second optic angle interval (β) is an angle interval of approximately 30 degrees, and the third optic angle interval (γ) is an angle interval of approximately 130 degrees.

13. The indicator of claim 11 wherein the instructional message of the first image includes an arrow pointing in the downward direction to instruct the passenger to move the seat of the vehicle in the downward direction and the instructional message of the third image includes an arrow pointing in the upward direction to instruct the passenger to move the seat of the vehicle in the upward direction.

14. The indicator of claim 11 wherein the lenticular lens is a plastic card and the base is configured to fasten to at least one of an A-pillar of the vehicle, a B-pillar of the vehicle, and a C-pillar of the vehicle.

15. The indicator of claim 11 wherein the first image is substantially transparent.

16. The indicator of claim 11 wherein the lenticular lens is a plastic card configured to tilt and incline relative to the base about a horizontal axis running the center of the plastic card.

17. The indicator of claim 16 wherein the first image is substantially transparent.

18. An indicator for a passenger in a vehicle, the indicator comprising:

a composite image having at least a first image indicating the passenger is seated correctly in the vehicle, a second image having an arrow pointing in the downward direction and a written instructional message instructing the passenger to move a seat of the vehicle in a downward direction, and a third image having an arrow pointing in the upward direction and a written instructional message instructing the passenger to move the seat of the vehicle in an upward direction;

a lenticular lens optically aligned with the composite image, the lens being disposed in a plane, the lens having a plurality of lenticules protruding at an angle that is angularly offset from a line normal to the plane in which the lens is disposed, and the lens being configured to display the first image within a first optic angle interval (α) of approximately 20 degrees, the second image within a second optic angle interval (β) of approximately 30 degrees, and the third image within a third optic angle interval (γ) of approximately 130 degrees; and a base configured to secure the lenticular lens to the composite image and fasten to an A-pillar of the vehicle above a steering wheel of the vehicle;

wherein the first optic angle interval (α) is between the second and third optic angle intervals (β and γ);

wherein the lenticular lens prevents the passenger from viewing the second and third images when the passenger views the composite image within the first optic angle interval (α), the first and third messages images when the passenger views the composite image within the second optic angle interval (β), and the first and second images when the passenger views the composite image within the third optic angle interval (γ);

wherein the first and second optic angle intervals (α and β) are angularly offset from the line normal to the plane based on an angle (δ) that is between the plane in which the lens is disposed and ground; and wherein the passenger views the first image when viewing the composite image within the first optic angle interval (α), the second image when viewing the composite image within the second optic angle interval (β), and the third image when viewing the composite image within the third optic angle interval (γ).

19. The indicator of claim 18 wherein the first image is substantially transparent.

20. The indicator of claim 18 wherein the lenticular lens is a plastic card configured to tilt and incline relative to the base about a horizontal axis running the center of the plastic card, the first image being substantially transparent to indicate that the passenger is positioned correctly in the vehicle, the second image indicating the passenger is positioned too high in the vehicle, and the third image indicating the passenger is positioned too low in the vehicle.

* * * * *